(12) United States Patent
Bhide et al.

(10) Patent No.: US 11,140,095 B2
(45) Date of Patent: Oct. 5, 2021

(54) CONTENT DISTRIBUTION RESOURCE ALLOCATION

(71) Applicant: Yahoo!, Inc., Sunnyvale, CA (US)

(72) Inventors: Shashank Bhide, Fremont, CA (US); Sudhir Chauhan, Sunnyvale, CA (US); Kshitiz Tripathi, San Jose, CA (US)

(73) Assignee: Verizon Media Inc., New York, NY (US)

( * ) Notice: Subject to any disclaimer, the term of this patent is extended or adjusted under 35 U.S.C. 154(b) by 474 days.

(21) Appl. No.: 14/591,204

(22) Filed: Jan. 7, 2015

(65) Prior Publication Data

US 2016/0197848 A1 Jul. 7, 2016

(51) Int. Cl.
*H04L 12/911* (2013.01)
*G06F 9/00* (2006.01)
*H04L 12/927* (2013.01)

(52) U.S. Cl.
CPC .............. *H04L 47/823* (2013.01); *G06F 9/00* (2013.01); *H04L 47/801* (2013.01)

(58) Field of Classification Search
CPC ........ H04L 47/823; H04L 47/801; G06F 9/00
USPC ........................................................ 709/224
See application file for complete search history.

(56) References Cited

U.S. PATENT DOCUMENTS

| | | | | |
|---|---|---|---|---|
| 2006/0059253 A1* | 3/2006 | Goodman | ............... | G06Q 10/06 709/223 |
| 2009/0210890 A1* | 8/2009 | Tully | .................. | G06F 17/3089 719/331 |
| 2010/0332660 A1* | 12/2010 | Fonseca | ............ | G06F 17/30477 709/226 |
| 2014/0052825 A1* | 2/2014 | Luecke | ................. | H04L 67/327 709/219 |
| 2014/0122725 A1* | 5/2014 | Batrouni | ............. | H04L 67/2842 709/226 |
| 2014/0258546 A1* | 9/2014 | Janssens | ............... | G06F 9/5088 709/226 |
| 2015/0317678 A1* | 11/2015 | Huang | ............... | G06Q 30/0241 705/14.54 |

* cited by examiner

*Primary Examiner* — Vivek Srivastava
*Assistant Examiner* — Hien V Doan
(74) *Attorney, Agent, or Firm* — Cooper Legal Group, LLC (57) ABSTRACT

One or more methods and/or techniques for content resource allocation are provided herein. A user, of a client device, may access content. Real time user traffic associated with accessing the content may be determined. A trend may be identified from the real time user traffic for the content. The real time user traffic may be indicative of an amount of the content distribution resources used to provide a threshold level of service to users. Responsive to the trend indicating a projected increase in real time user traffic for the content, the content distribution resources may be allocated to the content based upon the projected increase, such that the allocated content distribution resources provide the threshold level of service to the user.

19 Claims, 8 Drawing Sheets

CONTENT DISTRIBUTION RESOURCE ALLOCATION

BACKGROUND

When a user, of a client device, accesses content (e.g., media, images, text, etc.), content distribution resources may be allocated for providing the content to the user. User traffic to the content may have spikes and/or lulls (e.g., a holiday movie may have an increased spike in access during a corresponding holiday season, but may have little user traffic during other times of the year). During an increase in the user traffic to the content, such as an unplanned spike in user traffic, some users may be unable to access the content, or may experience delays in accessing the content, due to unavailability of content distribution resources (e.g., a media item going viral may cause a spike in the user traffic for content relating to the media item). During an unexpected lull in the user traffic, the content distribution resources may be underutilized (e.g., the content distribution resources may be providing a capacity higher than a capacity threshold used to provide the content adequately).

SUMMARY

In accordance with the present disclosure, real time user traffic, associated with accessing content (e.g., media, images, text, etc.) provided by a content provider, may be determined. The real time user traffic may be determined based upon receipt of a beacon that is generated when a user accesses the content, such as the user clicking on a page comprising the content and/or accessing an application comprising the content.

A trend may be identified from the real time user traffic for the content. The trend may be determined by utilizing a feedback loop associated with the user accessing the content, accessing a content provider entity (e.g., a second entity, different than the content provider, that displays the content, such as a new reader application that aggregates and displays news stories from various sources) comprising the content, and/or accessing the content provider. The feedback loop may compare the real time user traffic with usage of content distribution resources during a same timeframe to confirm an accuracy of the real time user traffic. The trend may be used to generate a log. The log may comprise a type of the trend associated with the content (e.g., whether the real time user traffic is increasing or decreasing at linear rate, an exponential rate, etc.), a type of the content (a news item, an entertainment item, a media item, etc.), and/or a duration of the trend (e.g., hours, days, months, etc.).

Responsive to the trend indicating a projected increase in the real time user traffic for the content, the content distribution resources may be allocated, based upon the projected increase, from an open stack (e.g., an identification of available and/or unallocated content distribution resources) to the content (e.g., additional processing resources, memory resources, bandwidth, and/or servers may be dynamically allocated and/or configured for serving the content to users). Responsive to the trend indicating a projected decrease in the real time user traffic for the content, the content distribution resources may be allocated, based upon the projected decrease, from the content to the open stack. The real time user traffic may be indicative of an amount of the content distribution resources used to provide a threshold level of service to users (e.g., the threshold level may comprise an amount of content distribution resources that are capable of providing content access to a number of users indicated by the trend). In an example, an event, indicative of a projected change in the trend, may be identified. The content distribution resources may be allocated from the open stack to content related to the event.

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

1. Computing Scenario

The following provides a discussion of some types of computing scenarios in which the disclosed subject matter may be utilized and/or implemented.

1.1. Networking

Figure 1:
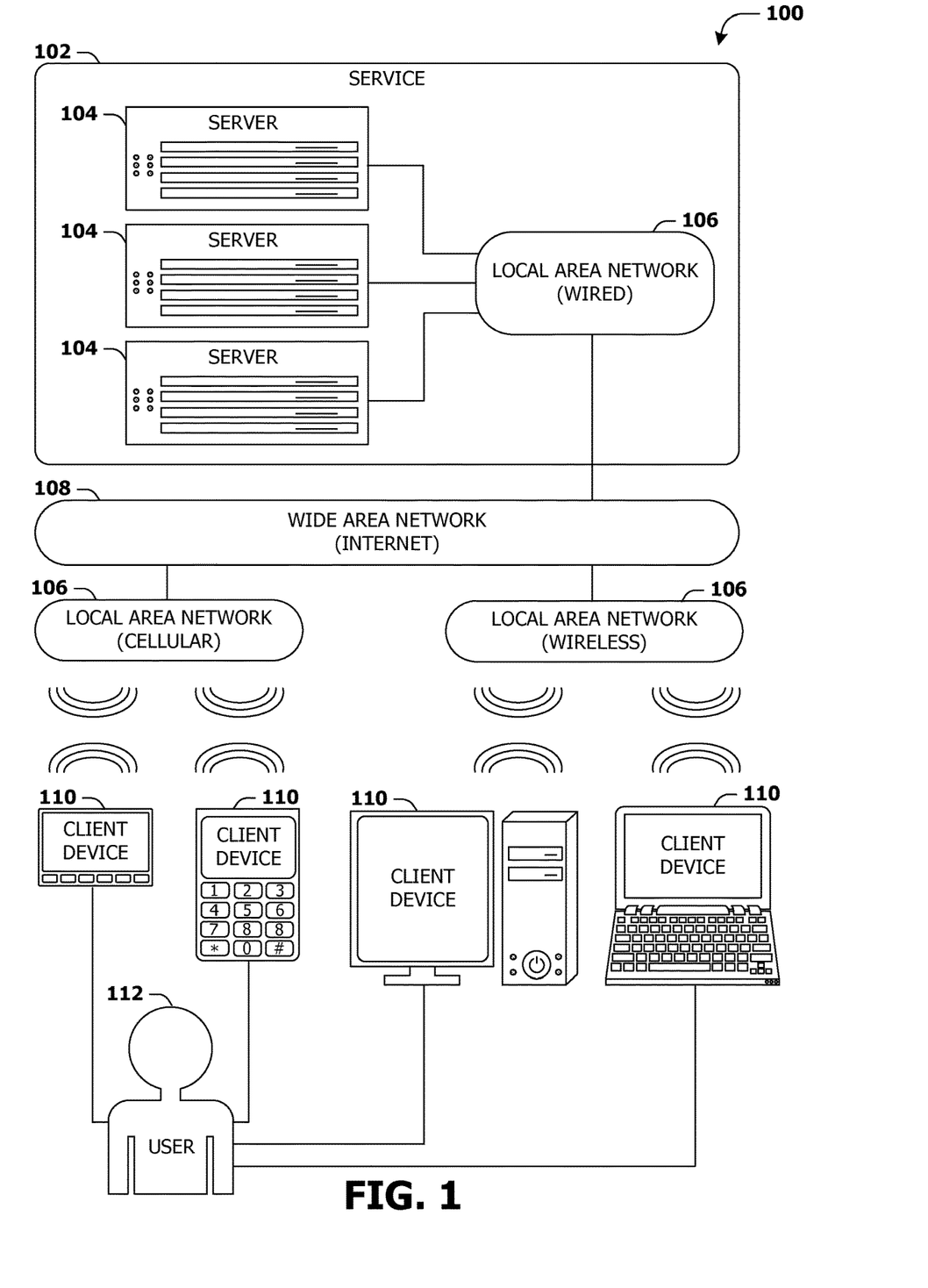
FIG. 1 is an illustration of a scenario involving various examples of networks that may connect servers and clients.

FIG. 1 is an interaction diagram of a scenario 100 illustrating a service 102 provided by a set of servers 104 to a set of client devices 110 via various types of networks. The servers 104 and/or client devices 110 may be capable of transmitting, receiving, processing, and/or storing many types of signals, such as in memory as physical memory states.

The servers 104 of the service 102 may be internally connected via a local area network 106 (LAN), such as a wired network where network adapters on the respective servers 104 are interconnected via cables (e.g., coaxial and/or fiber optic cabling), and may be connected in various topologies (e.g., buses, token rings, meshes, and/or trees). The servers 104 may be interconnected directly, or through one or more other networking devices, such as routers, switches, and/or repeaters. The servers 104 may utilize a variety of physical networking protocols (e.g., Ethernet and/or Fibre Channel) and/or logical networking protocols (e.g., variants of an Internet Protocol (IP), a Transmission Control Protocol (TCP), and/or a User Datagram Protocol (UDP). The local area network 106 may include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. The local area network 106 may be organized according to one or more network architectures, such as server/client, peer-to-peer, and/or mesh architectures, and/or a variety of roles, such as administrative servers, authentication servers, security monitor servers, data stores for objects such as files and databases, business logic servers, time synchronization servers, and/or front-end servers providing a user-facing interface for the service 102.

Likewise, the local area network 106 may comprise one or more sub-networks, such as may employ differing architectures, may be compliant or compatible with differing protocols and/or may interoperate within the local area network 106. Additionally, a variety of local area networks 106 may be interconnected; e.g., a router may provide a link between otherwise separate and independent local area networks 106.

In the scenario 100 of FIG. 1, the local area network 106 of the service 102 is connected to a wide area network 108 (WAN) that allows the service 102 to exchange data with other services 102 and/or client devices 110. The wide area network 108 may encompass various combinations of devices with varying levels of distribution and exposure, such as a public wide-area network (e.g., the Internet) and/or a private network (e.g., a virtual private network (VPN) of a distributed enterprise).

In the scenario 100 of FIG. 1, the service 102 may be accessed via the wide area network 108 by a user 112 of one or more client devices 110, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 110 may communicate with the service 102 via various connections to the wide area network 108. As a first such example, one or more client devices 110 may comprise a cellular communicator and may communicate with the service 102 by connecting to the wide area network 108 via a wireless local area network 106 provided by a cellular provider. As a second such example, one or more client devices 110 may communicate with the service 102 by connecting to the wide area network 108 via a wireless local area network 106 provided by a location such as the user's home or workplace (e.g., a WiFi network or a Bluetooth personal area network). In this manner, the servers 104 and the client devices 110 may communicate over various types of networks. Other types of networks that may be accessed by the servers 104 and/or client devices 110 include mass storage, such as network attached storage (NAS), a storage area network (SAN), or other forms of computer or machine readable media.

1.2. Server Configuration

Figure 2:
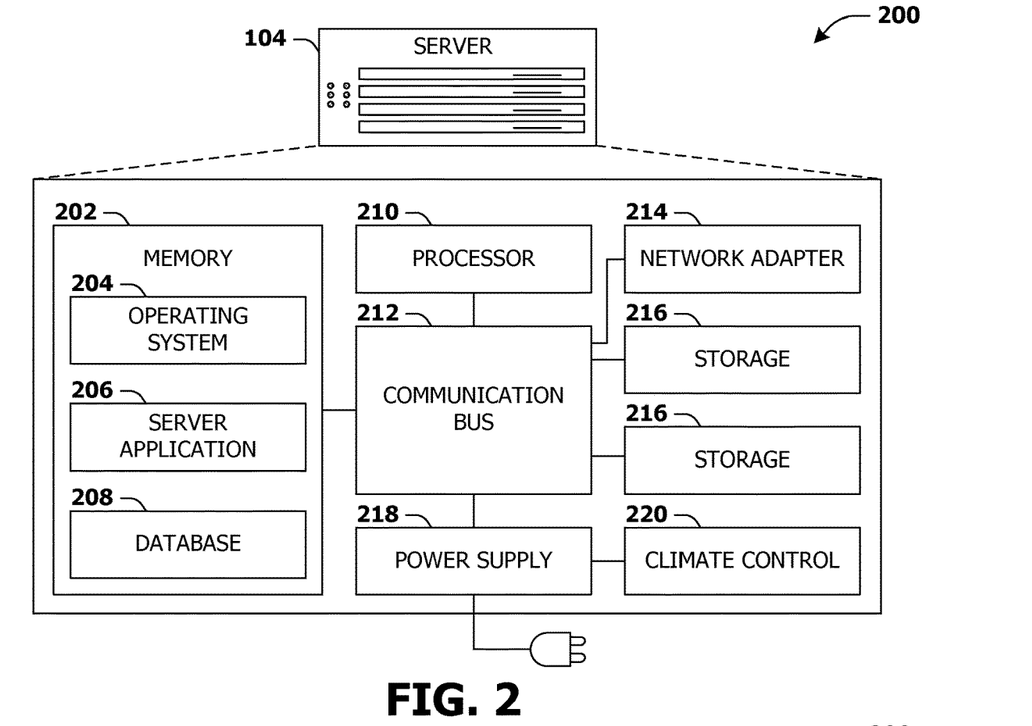
FIG. 2 is an illustration of a scenario involving an example configuration of a server that may utilize and/or implement at least a portion of the techniques presented herein.

FIG. 2 presents a schematic architecture diagram 200 of a server 104 that may utilize at least a portion of the techniques provided herein. Such a server 104 may vary widely in configuration or capabilities, alone or in conjunction with other servers, in order to provide a service such as the service 102.

The server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. The server 104 may comprise memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system. The server 104 may comprise a variety of peripheral components, such as a wired and/or wireless network adapter 214 connectible to a local area network and/or wide area network; one or more storage components 216, such as a hard disk drive, a solid-state storage device (SSD), a flash memory device, and/or a magnetic and/or optical disk reader.

The server 104 may comprise a mainboard featuring one or more communication buses 212 that interconnect the processor 210, the memory 202, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 212 may interconnect the server 104 with at least one other server. Other components that may optionally be included with the server 104 (though not shown in the schematic diagram 200 of FIG. 2) include a display; a display adapter, such as a graphical processing unit (GPU); input peripherals, such as a keyboard and/or mouse; and a flash memory device that may store a basic input/output system (BIOS) routine that facilitates booting the server 104 to a state of readiness.

The server 104 may operate in various physical enclosures, such as a desktop or tower, and/or may be integrated with a display as an "all-in-one" device. The server 104 may be mounted horizontally and/or in a cabinet or rack, and/or may simply comprise an interconnected set of components. The server 104 may comprise a dedicated and/or shared power supply 218 that supplies and/or regulates power for the other components. The server 104 may provide power to and/or receive power from another server and/or other devices. The server 104 may comprise a shared and/or dedicated climate control unit 220 that regulates climate properties, such as temperature, humidity, and/or airflow. Many such servers 104 may be configured and/or adapted to utilize at least a portion of the techniques presented herein.

1.3. Client Device Configuration

Figure 3:
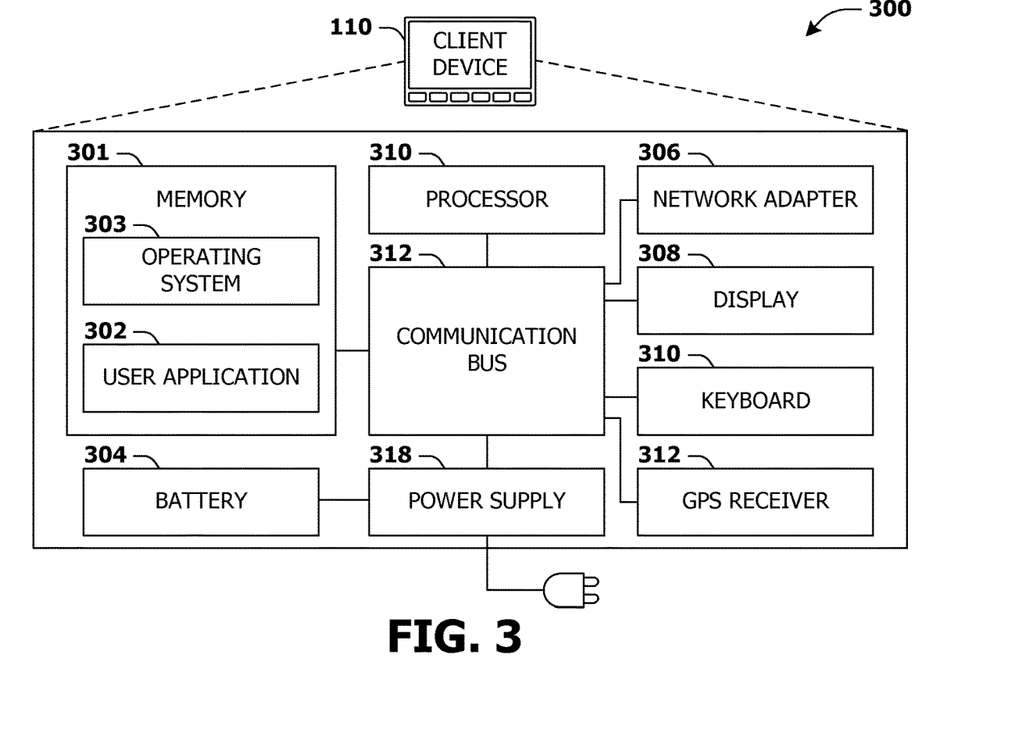
FIG. 3 is an illustration of a scenario involving an example configuration of a client that may utilize and/or implement at least a portion of the techniques presented herein.

FIG. 3 presents a schematic architecture diagram 300 of a client device 110 whereupon at least a portion of the techniques presented herein may be implemented. Such a client device 110 may vary widely in configuration or capabilities, in order to provide a variety of functionality to a user such as the user 112. The client device 110 may be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 110 may serve the user in a variety of roles, such as a workstation, kiosk, media player, gaming device, and/or appliance.

The client device 110 may comprise one or more processors 310 that process instructions. The one or more processors 210 may optionally include a plurality of cores; one or more coprocessors, such as a mathematics coprocessor or an integrated graphical processing unit (GPU); and/or one or more layers of local cache memory. The client device 110 may comprise memory 301 storing various forms of applications, such as an operating system 303; one or more user applications 302, such as document applications, media applications, file and/or data access applications, communication applications such as web browsers and/or email clients, utilities, and/or games; and/or drivers for various peripherals. The client device 110 may comprise a variety of peripheral components, such as a wired and/or wireless network adapter 306 connectible to a local area network and/or wide area network; one or more output components, such as a display 308 coupled with a display adapter (optionally including a graphical processing unit (GPU)), a sound adapter coupled with a speaker, and/or a printer; input devices for receiving input from the user, such as a keyboard 310, a mouse, a microphone, a camera, and/or a touch-sensitive component of the display 308; and/or environmental sensors, such as a global positioning system (GPS) receiver 312 that detects the location, velocity, and/or acceleration of the client device 110, a compass, accelerometer, and/or gyroscope that detects a physical orientation of the client device 110. Other components that may optionally be included with the client device 110 (though not shown in the schematic diagram 300 of FIG. 3) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness; and a climate control unit that regulates climate properties, such as temperature, humidity, and airflow.

The client device 110 may comprise a mainboard featuring one or more communication buses 312 that interconnect the processor 310, the memory 301, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 110 may comprise a dedicated and/or shared power supply 318 that supplies and/or regulates power for other components, and/or a battery 304 that stores power for use while the client device 110 is not connected to a power source via the power supply 318. The client device 110 may provide power to and/or receive power from other client devices.

In some scenarios, as a user 112 interacts with a software application on a client device 110 (e.g., an instant messenger and/or electronic mail application), descriptive content in the form of signals or stored physical states within memory (e.g., an email address, instant messenger identifier, phone number, postal address, message content, date, and/or time) may be identified. Descriptive content may be stored, typically along with contextual content. For example, the source of a phone number (e.g., a communication received from another user via an instant messenger application) may be stored as contextual content associated with the phone number. Contextual content, therefore, may identify circumstances surrounding receipt of a phone number (e.g., the date or time that the phone number was received), and may be associated with descriptive content. Contextual content, may, for example, be used to subsequently search for associated descriptive content. For example, a search for phone numbers received from specific individuals, received via an instant messenger application or at a given date or time, may be initiated. The client device 110 may include one or more servers that may locally serve the client device 110 and/or other client devices of the user 112 and/or other individuals. For example, a locally installed webserver may provide web content in response to locally submitted web requests. Many such client devices 110 may be configured and/or adapted to utilize at least a portion of the techniques presented herein.

2. Presented Techniques

One or more systems and/or techniques for content distribution resource allocation are provided herein. A user, of a client device, may access content (e.g., media, images, text, etc.), which may generate user traffic for a content provider of the content. Content distribution resources may be allocated to obtain a capacity for providing a threshold level of service to the user (e.g., processing resources, memory resources, bandwidth, and/or servers may be dynamically allocated and/or configured for serving the content to users). The content may have spikes and/or lulls in the user traffic (e.g., if a volcano erupts in Volcanoville, then content related to Volcanoville may have increased user traffic as compared to user traffic to Volcanoville content prior to the eruption). During an increase in the user traffic, additional content distribution resources may be utilized to achieve an increased capacity used to provide the content to users. Unfortunately, during an unanticipated increase in user traffic, the additional content distribution resources may not be obtained quickly enough to maintain service to all users, thus causing some users to be unable to access the content. During an unexpected lull in user traffic, the content distribution resources may be underutilized (e.g., the content distribution resources may be providing a capacity that is higher than the capacity for providing the threshold level of service to the user).

Accordingly, as provided herein, real time user traffic may be determined by generating a beacon based upon the user interacting with the content. A number of beacons received may correlate to a number of users accessing the content. A trend may be identified based upon a rate at which the number of users accessing the content increases, decreases, or stagnates. The trend may be used to dynamically allocate the content distribution resources, based upon predicted future user traffic to the content (e.g., if the trend is projecting an increase in the real time user traffic, then the content distribution resources may be allocated from an open stack to the content in order to adjust for a predicted future increase in user traffic; if the trend is projecting a decrease in the real time user traffic, then the content distribution resources may be allocated from the content to the open stack for use in providing access to other content).

Determining the real time user traffic allows for real time allocation of the content distribution resources based upon a trending and/or predicted future increase or decrease in user traffic, which may mitigate computing resources, such as power consumption, processing resources, and/or bandwidth, otherwise wasted by inefficient allocation of the content distribution resources. In an example, power consumption may be mitigated by merely utilizing an amount of content distribution resources used to provide the threshold level of service correlated to the trend, as opposed to operating extra content distribution resources. Processing resources and/or bandwidth may be mitigated by having the content distribution resources allocated to the open stack for quick and efficient dynamic allocation.

Figure 4:
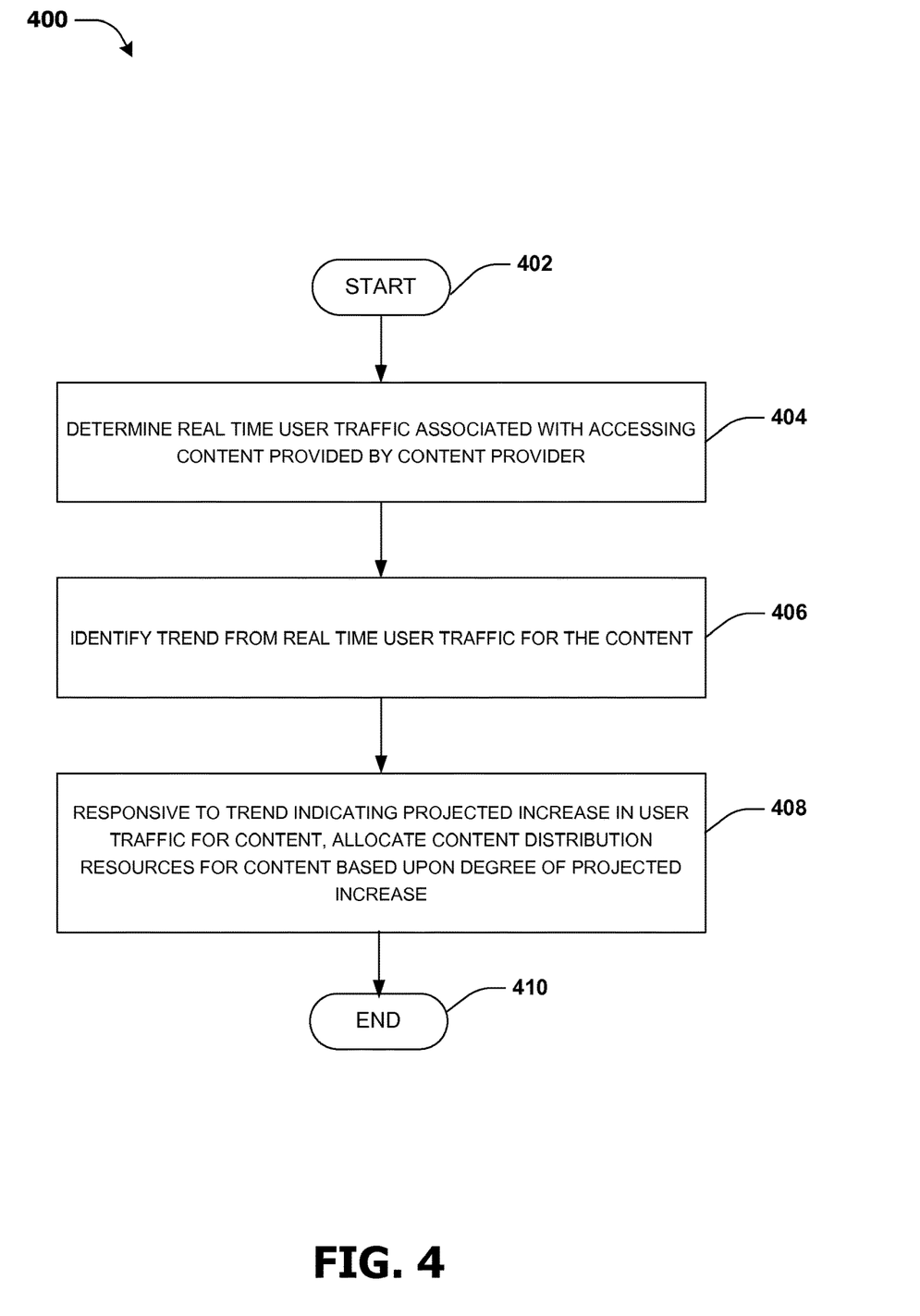
FIG. 4 is a flow chart illustrating an example method of content distribution resource allocation.

An embodiment of content distribution allocation is illustrated by an example method 400 of FIG. 4. At 402, the method 400 starts. A user, of a client device, may interact with content (e.g., media, images, text, etc.). A beacon may be generated when the user interacts with the content (e.g., accesses the content, clicks on a page comprising the content, accesses an application comprising the content, etc.). In an example, the beacon may comprise user information about the user's interaction with the page on which the content is located. The user information may comprise a device identification associated with the user, how long the user remains on the page, how far down the page the user scrolls, etc. At 404, real time user traffic, associated with accessing the content provided by a content provider, may be determined. The real time user traffic may be correlated to a number of beacons received. In an example, if 1,000 beacons are received within a timeframe (e.g., 1 minute to about 10 minutes, or any other timeframe), then the real time user traffic may comprise 1,000 users for the timeframe.

At 406, a trend may be identified from the real time user traffic for the content. The trend may comprise a change in the number of users accessing the page comprising the content, over a trend timeframe (e.g., 10 minutes to about 1 hour, or some other timeframe). In an example, if a first number of beacons (e.g., 10,000 or some other number of beacons) are received during the timeframe and an increased number of beacons (e.g., 100,000 or some other number of beacons) are received during a second timeframe (e.g., 1 minute to about 10 minutes, or any other timeframe) following the timeframe, then the trend may indicate that the real time user traffic may increase at a first rate (e.g., an exponential rate and/or by a factor of 10). The trend may comprise an average time that users are remaining on the page and/or an average amount of the content that the users view (e.g., how far down does the user scroll on the page).

The trend may be determined by utilizing a feedback loop associated with the user accessing the content, a content provider entity comprising the content (e.g., a second entity, different than the content provider, that displays the content such as a new reader application that aggregates and displays news stories from various sources), and/or the content provider. The feedback loop may compare the real time user traffic with usage of content distribution resources during a same timeframe to confirm an accuracy of the real time user traffic. The trend may be used to generate a log. The log may comprise a type of the trend associated with the content (e.g., if the real time user traffic is increasing or decreasing at linear rate, an exponential rate, etc.), a type of the content (news item, entertainment item, media item, etc.), and/or a duration of the trend (e.g., hours, days, months, etc).

At 408, responsive to the trend indicating a projected increase in the real time user traffic for the content, the content distribution resources may be allocated from an open stack (e.g., a pool of content distribution resources that are not allocated to content) to the content based upon the projected increase (e.g., additional processing resources, memory resources, bandwidth, and/or servers may be dynamically allocated and/or configured for serving the content to users). Responsive to the trend indicating a projected decrease in the real time user traffic for the content, the content distribution resources may be allocated from the content to the open stack based upon the projected decrease, so that such content distribution resources may be made available for other tasks, such as serving other content to users.

An amount of the content distribution resources that are allocated may be based upon the amount of the content distribution resources used to provide a threshold level of service to users (e.g., the threshold level may comprise the amount of content distribution resources correlating to a capacity used to provide service to a number of users project/predicted by the trend to access the content). In an example, if the trend indicates that real time user traffic may increase at a first traffic rate (e.g., at a factor of 10 every 10 minutes or some other rate), then the content distribution resources may be allocated to the content at a resource rate correlated to the trend rate. The resource rate may be calculated to maintain a capacity equal to or over the capacity used to provide service for the projected number of users. In an example, the capacity may correspond to an amount of content distribution resources that can provide service to the projected number of users for the average amount of time that the users are remaining on the page and/or for the average amount of content the user views. At 410, the method 400 ends.

Figure 5A:
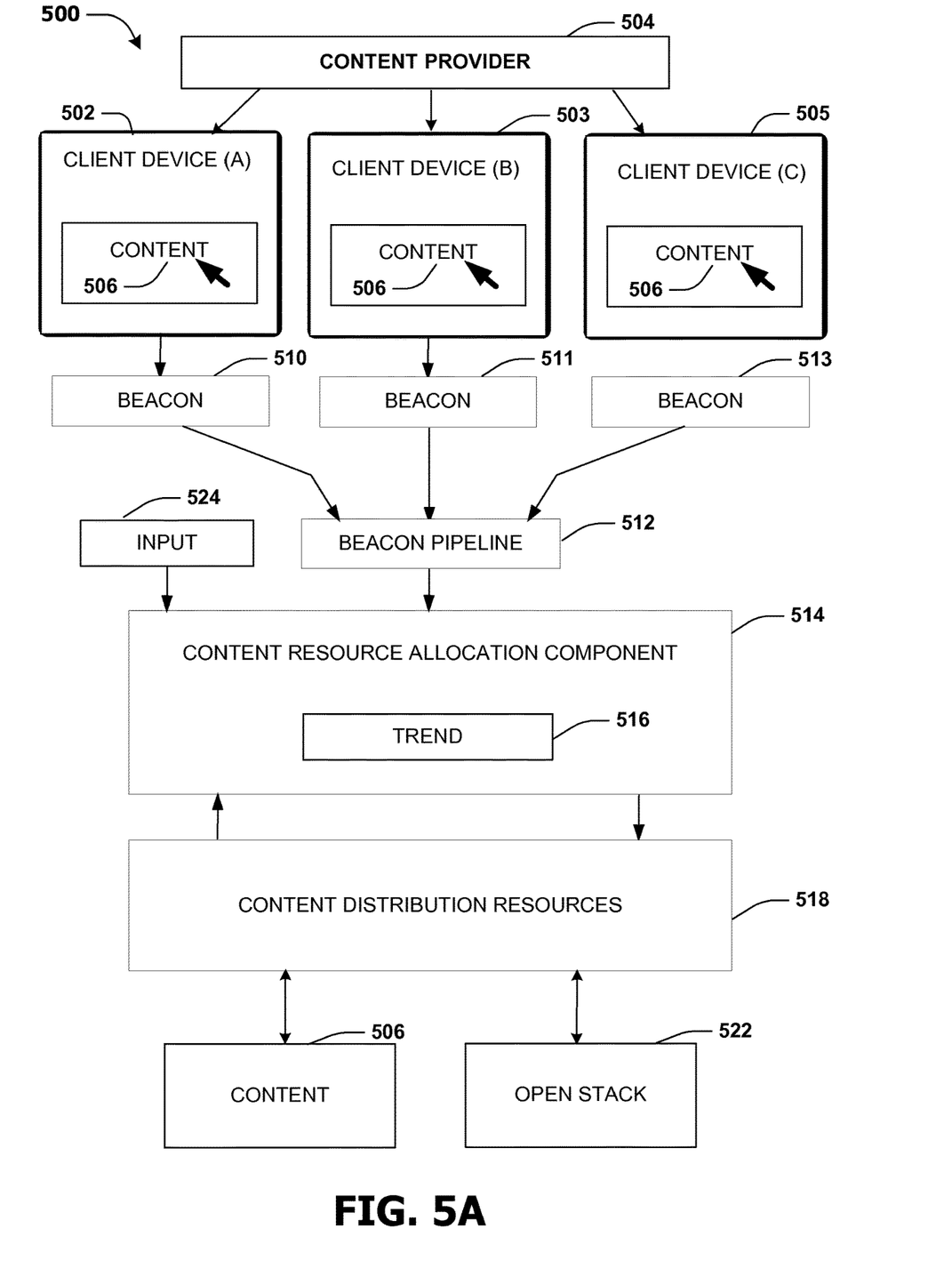
FIG. 5A is a component block diagram illustrating an example system for content distribution resource allocation, where content distribution resources are allocated from an open stack to content.
Figure 5B:
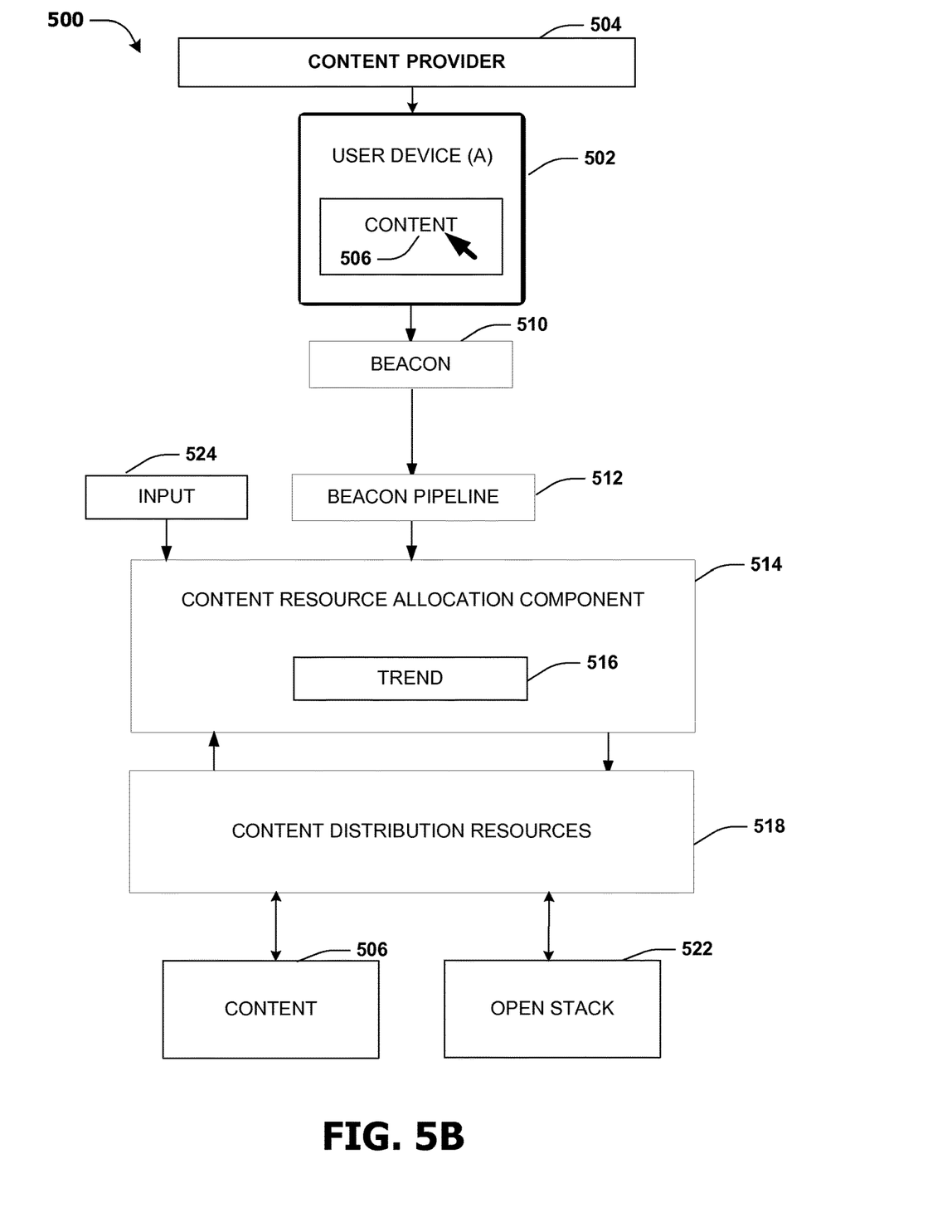
FIG. 5B is a component block diagram illustrating an example system for content distribution resource allocation, where content distribution resources are allocated from content to an open stack.
Figure 5C:
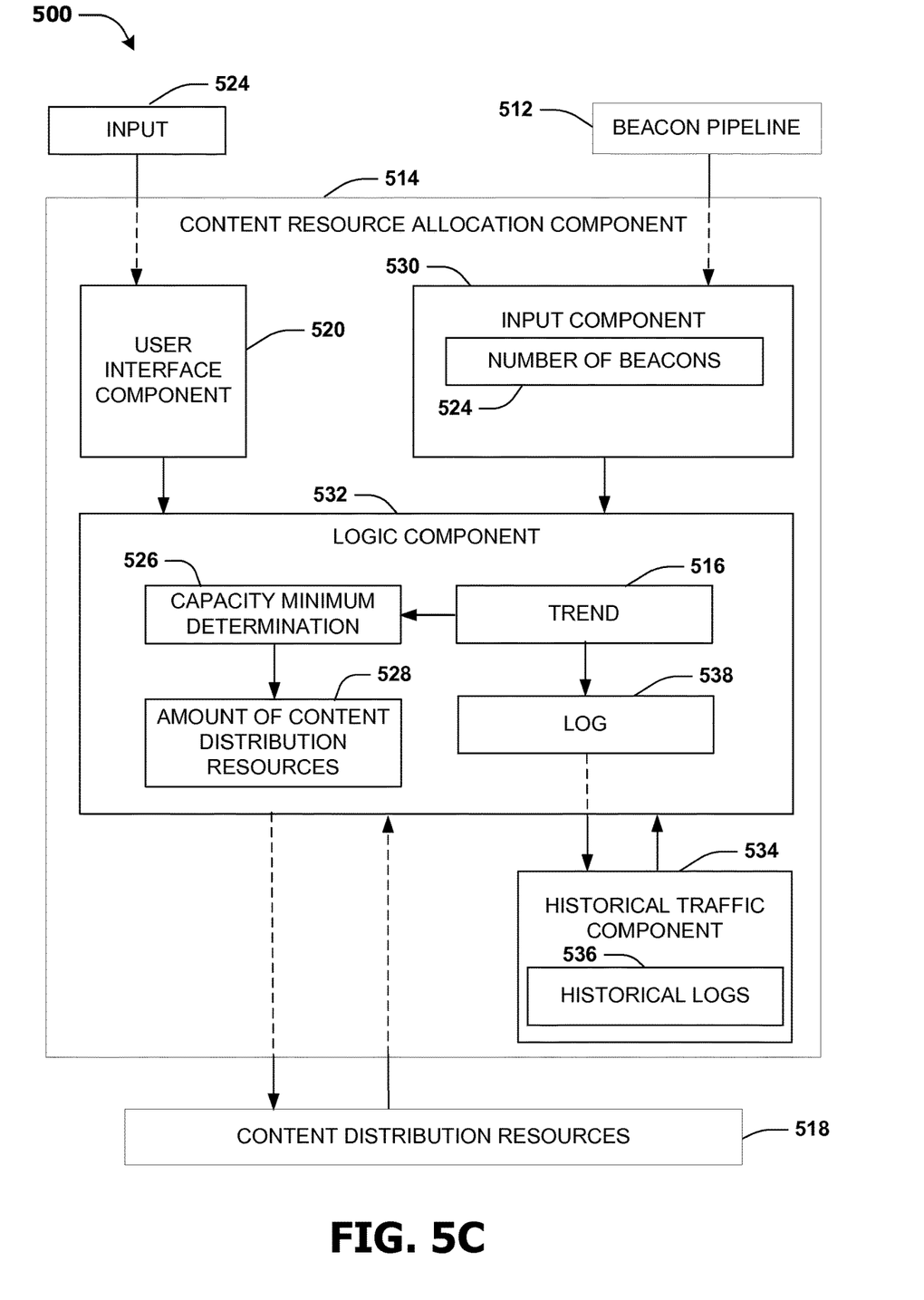
FIG. 5C is a component block diagram illustrating an example system for content distribution resource allocation.

FIGS. 5A-5C illustrate a system 500, comprising a content resource allocation component 514, for allocating content distribution resources 518 responsive to changes in real time user traffic, such as dynamic reallocation based upon predicted increases or decreases in user traffic based upon trends in the real time user traffic. FIGS. 5A-5B illustrate user interaction with content 506. A user (A) of a client device (A) 502, a user (B) of a client device (B) 503, a user (C) of a client device (C) 505, and/or other users of other client devices may interact with the content 506 provided by a content provider 504. The content 506 may have a baseline amount of the content distribution resources 518 allocated for providing the content 506 to users. The baseline amount of the content distribution resources 518 may correlate to a baseline capacity for providing an initial threshold level of service for an anticipated initial user traffic (e.g., the anticipated initial user traffic may comprise an estimate of a number of users likely to access the content 506). In an example, the initial threshold level may comprise an amount of the content distribution resources 518 correlating to a capacity used to provide service (e.g., access to the content) to a number of users indicated by the anticipated initial user traffic.

Responsive to the user (A) interacting with the content 506, a beacon 510 may be generated. Responsive to the user (B) interacting with the content 506, a beacon 511 may be generated. Responsive to the user (C) interacting with the content 506, a beacon 513 may be generated. A beacon may be generated responsive to a user viewing a page on which the content 506 is displayed, the user clicking on the page, and/or the user opening an application comprising the content 506. The beacon may include a device identification, an IP address, a location of the user, how long the user remains on the page, how far down the page the user scrolls on the page, etc.

In an example, where the content 506 is accessed through a page, such as a webpage, a page opening event of a browser hosting the page comprising the content 506, may prompt a request related to the content 506 at a query language server. The receipt of the request may prompt the generation of the beacon, and the beacon may go through a beacon pipeline 512 (e.g., the beacon may go through a beacon server that may decode the beacon, and a data highway may deliver the decoded beacon to the content resource allocation component 514).

In an example, where the content 506 is accessed through an application, an application opening event (e.g., as enacted by the application) may prompt a request related to the content 506 at the query language server. The receipt of the request may prompt the generation of the beacon, and the beacon may go through the beacon pipeline 512. In an example where the beacon is created based upon the user clicking on the page, the beacon may go through the data highway to the content resource allocation component 514.

The content resource allocation component 514 may correlate a number of beacons, generated responsive to the users interacting with the content 506, to a number of users interacting the content 506 over a timeframe (e.g., 1 minute to about 10 minutes, or some other timeframe) to determine the real time user traffic for the content 506. The content resource allocation component 514 may utilize the real time user traffic to generate a trend 516. The trend 516 may comprise a change in the number of users interacting with the page over a trend timeframe (e.g., 10 minutes to about 1 hour, or some other timeframe). In an example, if Famous Franny (a famous actress) marries her long time boyfriend Bo Badguy (a famous actor) in a secret ceremony, then the content 506 (e.g., a picture of the wedding) may experience increased real time user traffic. As the news of the wedding becomes more widespread, more users may interact with the content 506 (e.g., in the 5 minutes following the news of the wedding 100 users may interact with the content 506, but after 1 hour following the news of the wedding, 1 million users may be interacting with the content 506). The increase in users interacting with the content 506 over the one hour period may be used to determine the trend 516. Based on the trend 516, a projected increase may be determined (e.g., the projected increase may comprise an increase of 2 million users every hour until saturation is reached). The projected increase and a projected duration of the projected increase, may be based on past trends having similar attributes (e.g., the projected increase for Famous Franny and Bo Badguys wedding may be based on trends from content related to one or more celebrity weddings).

In an example, an input 524 may be input into the content resource allocation component 514. The input 524 may comprise an override for the trend 516 and/or a content distribution resources allocation request (e.g., content related to an upcoming event may be allocated an increased amount of the content distribution resources 518). The input 524 may be based on information about events that have yet to occur. For example, if traditionally Sunday Night Sports Event content has an increase in the real time user traffic on and around Sunday nights, then the content distribution resources 518 may be allocated prior to Sunday night. The content resource allocation component 514 may identify a Sports trend associated with Sunday Night Sports Event content, and may allocate the content distribution resources 518 based upon the Sports trend.

FIG. 5A illustrates an increase in the real time user traffic for the content 506. In an example, the number of users accessing the content 506 may increase as compared to the anticipated initial user traffic and/or previous real time user traffic (e.g., real time user traffic determined in a timeframe before a current timeframe). The trend 516 may be generated based upon the increased real time user traffic. Responsive to the trend 516 indicating the projected increase in the real time user traffic for the content 506, the content resource allocation component 514 may allocate the content distribution resources 518 from an open stack 522 (e.g., a pool of content distribution resources 518 that are not allocated to content) to the content 506 based upon the projected increase (e.g., the allocation of the content resource allocation component 514 may be dynamically configured to provide users with access to the content 506).

The content resource allocation component 514 may allocate an amount of the content distribution resources 518 based upon the amount of the content distribution resources 518 used to provide a threshold level of service to users (e.g., the threshold level may comprise the amount of content distribution resources correlating to a capacity used to provide service to a number of users indicated by the trend 516, such as a projection of users that will be accessing the content 506). In an example, the capacity may comprise the capacity used to provide service (e.g., access to the content 506) to the projected number of users for the average amount of time that the users are remaining on the page and/or for the average amount of the content 506 that the users view. The capacity may comprise a capacity correlated to the trend 516. In an example, if the content distribution resources 518 are provided by a content distribution provider that is a different provider than the content provider, then a negotiation with the content distribution provider may be performed.

FIG. 5B illustrates a decrease in the real time user traffic for the content 506. In an example, the number of users accessing the content 506 may decrease as compared to the anticipated initial user traffic and/or the previous real time user traffic. The trend 516 may be generated based upon the decreased real time user traffic. Responsive to the trend 516 indicating a projected decrease in the real time user traffic for the content 506, the content resource allocation component 514 may allocate the content distribution resources 518 from the content 506 to the open stack 522 based upon the projected decrease.

FIG. 5C illustrates the content resource allocation component 514 comprising a user interface component 520, an input component 530, a logic component 532, and a historical traffic component 534. The input component 530 may determine a number of beacons 524, generated from user interaction with the content 506, received over the first timespan. In an example, the input component 530 may comprise a database that sorts beacons generated from user interaction with various content and determines a first number of beacons that were generated from interaction with a first content, a second number of beacons that were generated from interaction with a second content, etc. The input component 530 may sort the content 506 based upon the content provider entity (e.g., the content provider entity may comprise a second entity different than the content provider, that displays the content such as a secondary website) and/or the content provider (e.g., the content 506 provided by the content provider may be sorted differently than the content 506 provided by the content provider entity). The input component 530 may correlate the number of beacons 524 to the real time user traffic (e.g., the receipt of 10 beacons related to the content 506 may correlate to 10 users interacting with the content 506). The input component 530 may periodically (e.g., every 10 minutes, 1 hour, 1 day, etc. or any other period) report the number of beacons 524 to the logic component 532. The input component 530 and the logic component 532 may be a same or different component.

The logic component 532 may generate the trend 516 based on the real time user traffic. The trend 516 may be determined by utilizing the feedback loop associated with the user accessing the content 506, accessing the content provider entity comprising the content 506, and/or accessing the content provider. The logic component 532 may use the trend 516 to generate a log 538. The log 538 may comprise the type of the trend 516 associated with the content 506 (e.g., if the real time user traffic is increasing or decreasing at linear rate, an exponential rate, etc.), the type of the content 506 (a news item, an entertainment item, a media item, etc.), and/or the duration of the trend 516 (e.g., hours, days, months, etc). The logic component 532 may be in communication with the historical traffic component 534. The logic component 532 may send the log 538 to the historical traffic component 534. The historical traffic component 534 may store the log 538 as a historical log 536.

The logic component 532 may generate a projected change (e.g., the projected increase, a projected stagnation, or the projected decrease) based upon the historical logs 536 related to the trend 516 (e.g., the historical log 536 may be related to the content 506 and/or an event related to the content 506). The historical logs 536 may be used to determine the duration of the trend 510 and/or a peak for the trend 510 (e.g., a point in time when the real time user traffic has reached a maximum).

The trend 516 may be used to determine the projected change in the real time user traffic. The real time user traffic may be correlated to a capacity minimum 526. In an example, the capacity minimum 526 may comprise a capacity used to provide the number of users, indicated by the real time user traffic, with service over a service threshold (e.g., the service threshold specifying that the content 506 is to be provided to users within a threshold timespan). The capacity minimum 526 may correspond to an amount 528 of the content distribution resources 518 that are to be allocated to providing the content 506. Responsive to the amount 528 of the content distribution resources 518 corresponding to the capacity minimum 526, the content distribution resources 518 may be allocated from the open stack 522 (e.g., the open stack 522 illustrated in FIGS. 5A and 5B) to the content 506 in accordance with the amount 528. In an example, if the projected increase indicates that over the first timeframe (e.g., one hour or some other timeframe) the real time user traffic may increase from 1,000 users to 5,000 users, and that over the second timeframe (e.g., two hours or some other time frame) the real time user traffic may increase from 1,000 users to 10,000 users, then the capacity minimum 526 for the first timeframe may be lower than the capacity minimum 526 for the second timeframe. Thus an amount of the content distribution resources 518 allocated to the content 506 for the first timeframe may be lower than the amount of content distribution resources 518 the allocated to the content 506 for the second timeframe. The user interface component 520 may comprise an interface though which input 524, used to override the trend 516, may be received.

The logic component 532 may maintain the feedback loop. The feedback loop may be utilized to compare the real time user traffic, as supplied by the input component 530, with usage of the content distribution resources 518 during a same timeframe to confirm an accuracy of the real time user traffic. Responsive to the real time user traffic not being accurate, the logic component 532 may increase and/or decrease the capacity minimum 526 to address the inaccuracy. For example, if the real time user traffic indicates more users are interacting with the content 506 than the usage of the content distribution resources 518, then the capacity minimum 526 may be lowered. If the real time user traffic indicates less users are interacting with the content 506 than the usage of the content distribution resources 518, then the capacity minimum 526 may be increased. A pay structure may be utilized based upon the feedback loop. In an example, content providers, providing the content 506, may pay a fee based on a number of users interacting with the content 506 as determined by the real time user traffic and/or the usage of the content distribution resources 518.

Figure 6:
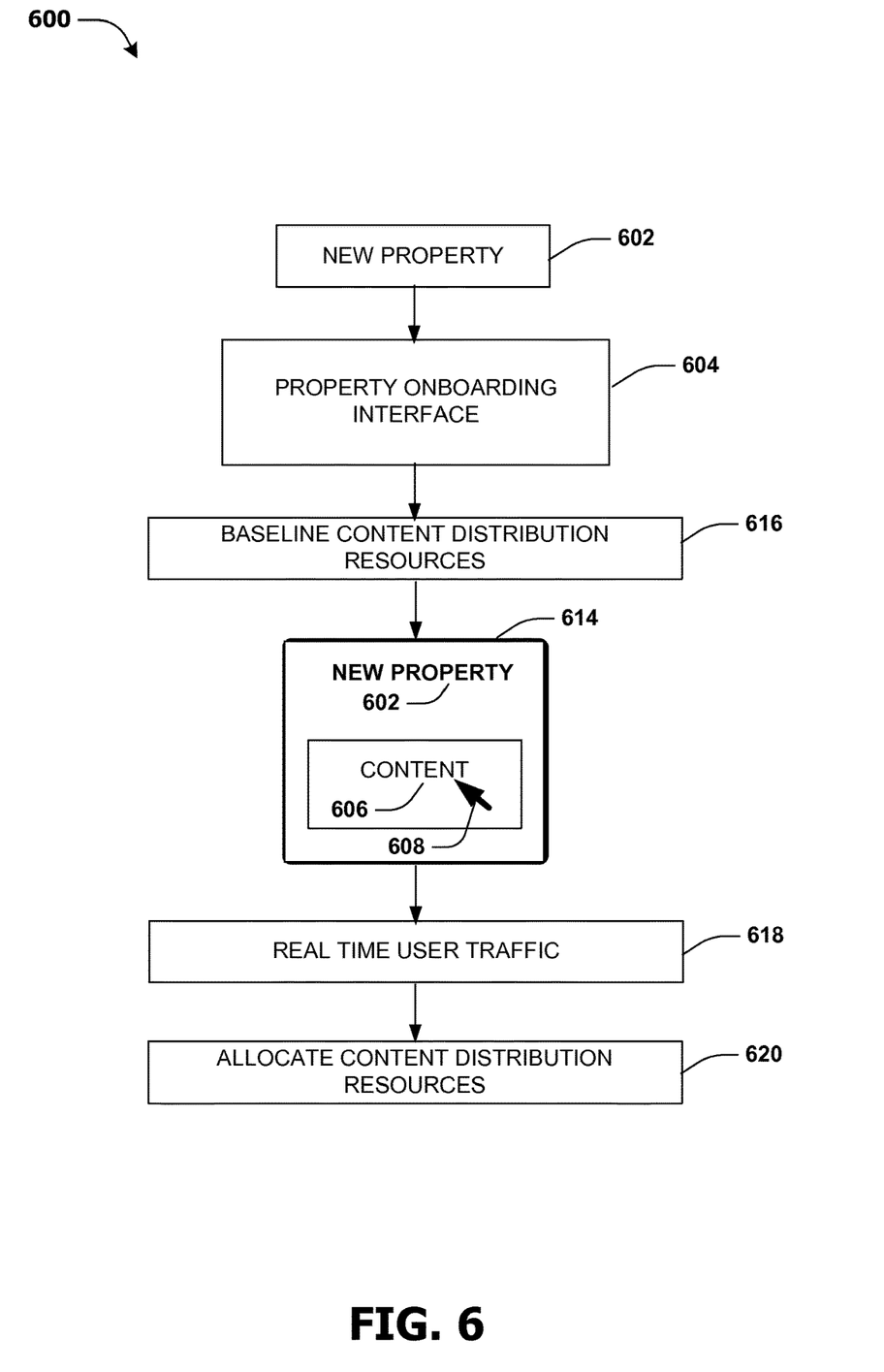
FIG. 6 is a component block diagram illustrating an example system for onboarding a new property.

FIG. 6 illustrates a system 600 configured to onboard a new property 602 (e.g., a new social media network content provider, a new webmail provider, etc.) through a property onboarding interface 604. In an example, the property onboarding interface 604 may comprise single selection onboarding functionality (e.g., a new property provider may onboard the new property 602 by uploading the new property 602 and merely selecting onboard). A baseline amount of content distribution resources 616 may be allocated to the new property 602.

The baseline amount of content distribution resources 616 may correlate to a baseline capacity for providing an initial threshold level of service for an anticipated initial user traffic (e.g., the initial user traffic may comprise an estimate of a number of users likely to access the new property 602 and/or content 606 on the new property 602). In an example, the initial threshold level may comprise an amount of content distribution resources correlating to a capacity minimum for providing service to a number of users indicated by the anticipated initial user traffic.

Based upon a number of users, of client devices 614, that interact 608 with the new property 602 and/or the content 606 on the new property 602, real time user traffic 618 may be identified. The real time user traffic 618 may be used to generate a trend. The trend may be used to determine a projected change (e.g., a projected increase, a projected decrease, or a projected stagnation) in the real time user traffic 618. Based upon the trend and/or the projected change, the content distribution resources may be allocated 620.

Figure 7:
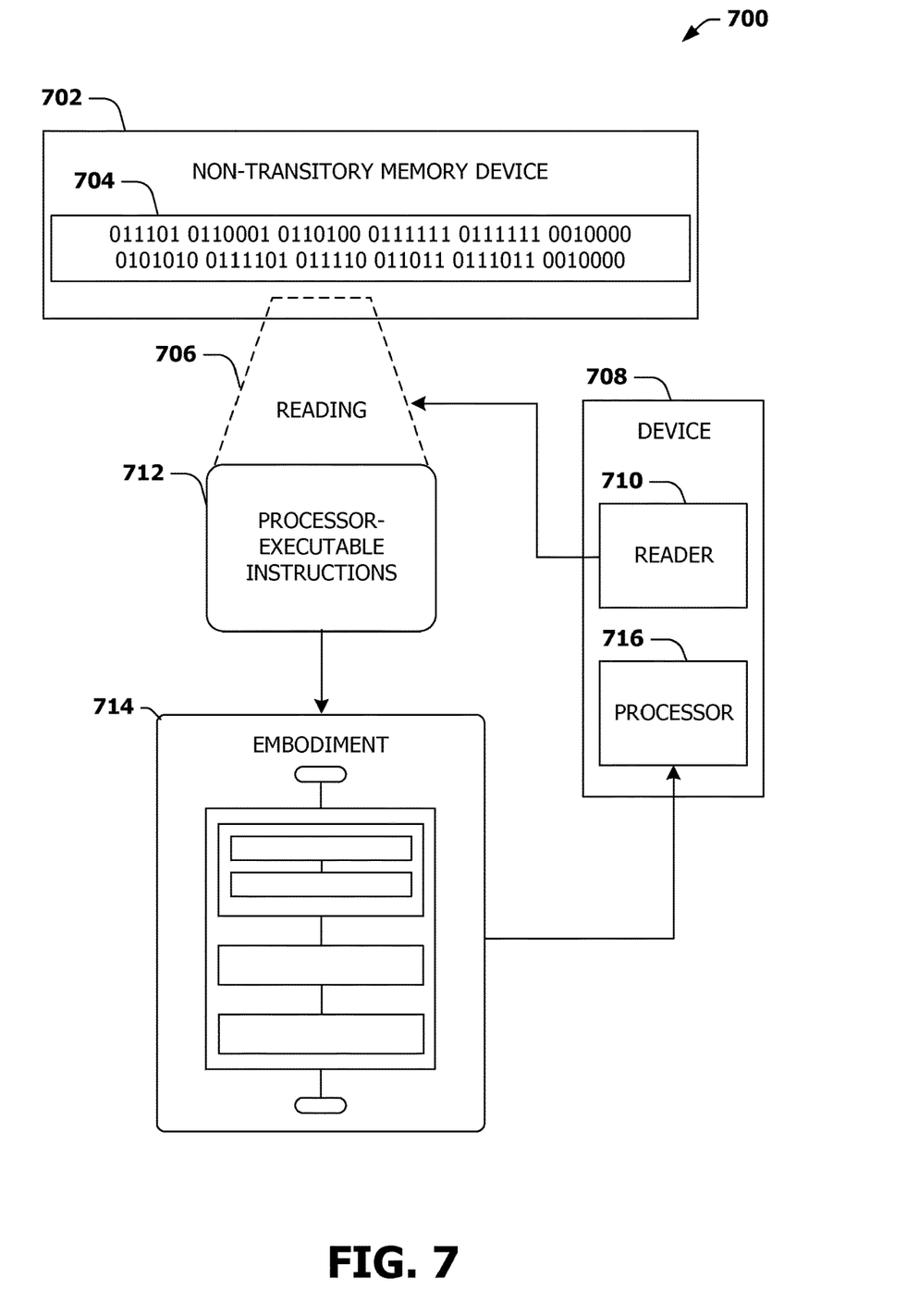
FIG. 7 is an illustration of a scenario featuring an example nontransitory memory device in accordance with one or more of the provisions set forth herein.

FIG. 7 is an illustration of a scenario 700 involving an example nontransitory memory device 702. The nontransitory memory device 702 may comprise instructions that when executed perform at least some of the provisions herein. The nontransitory memory device 702 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a CD, DVD, or floppy disk). The example nontransitory memory device 702 stores computer-readable data 704 that, when subjected to reading 706 by a reader 710 of a device 708 (e.g., a read head of a hard disk drive, or a read operation invoked on a solid-state storage device), express processor-executable instructions 712. In some embodiments, the processor-executable instructions, when executed on a processor 716 of the device 708, are configured to perform a method, such as at least some of the example method 400 of FIG. 4, for example. In some embodiments, the processor-executable instructions, when executed on the processor 716 of the device 708, are configured to implement a system, such as at least some of the example system 500 of FIGS. 5A-5C and/or at least some of the example system 600 of FIG. 6, for example.

3. Usage of Terms

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method of content distribution resource allocation, comprising:
   receiving a plurality of beacons each comprising information about an interaction of a user with content provided by a content provider;
   determining, based upon the plurality of beacons, real time user traffic associated with accessing the content;
   determining a rate at which a number of users accessing the content changes from a first number of users accessing the content over a first timeframe to a second number of users accessing the content over a second timeframe based upon the real time user traffic;
   creating a feedback loop associated with:
      a first user accessing the content;
      a second user accessing a content provider entity, different than the content provider, comprising the content; and
      a third user accessing the content provider;
   identifying a trend from the real time user traffic for the content based upon both the rate and the feedback loop;
   utilizing the trend to generate a log, the log comprising:
      a type of the trend associated with the content;
      a type of the content; and
      a duration of the trend;
   predicting future user traffic to the content based upon the trend; and
   responsive to the future user traffic indicating a projected increase in real time user traffic for the content, allocating content distribution resources for the content based upon the projected increase.

2. The method of claim 1, comprising:
   responsive to the future user traffic indicating a projected decrease in the real time user traffic for the content, allocating content distribution resources from the content to an open stack based upon the projected decrease.

3. The method of claim 1, wherein the rate corresponds to a factor by which the number of users accessing the content increases over a period of time.

4. The method of claim 1, comprising:
   utilizing the feedback loop to compare the real time user traffic with usage of the content distribution resources during a timeframe; and
   confirming an accuracy of the real time user traffic based upon the comparison.

5. The method of claim 1, the predicting future user traffic to the content based upon the trend comprising:
   predicting the future user traffic based upon the log.

6. The method of claim 1, the real time user traffic indicative of an amount of content distribution resources used to provide a threshold level of service to users.

7. The method of claim 1, the allocating content distribution resources comprising:
allocating content distribution resources from an open stack.

8. The method of claim 1, comprising:
responsive to the future user traffic indicating the projected increase, negotiating with a content distribution provider to procure additional content distribution resources.

9. The method of claim 1, comprising:
identifying an event indicative of a projected change in the trend.

10. The method of claim 9, comprising:
responsive to identifying the event, allocating content distribution resources to content related to the event.

11. The method of claim 1,
a beacon of the plurality of beacons indicating at least one user has at least one of:
accessed the content;
clicked on a page comprising the content; or
accessed an application comprising the content.

12. The method of claim 1, comprising:
utilizing a pay structure for the content provider based upon the real time user traffic associated with the content.

13. A system, comprising:
a processor; and
memory comprising processor-executable instructions that when executed by the processor implement a content resource allocation component configured to:
receiving a plurality of beacons each comprising information about an interaction of a user with content provided by a content provider;
determine, based upon the plurality of beacons, real time user traffic associated with the content;
determine a rate at which a number of users accessing the content decreases from a first number of users accessing the content over a first timeframe to a second number of users accessing the content over a second timeframe based upon the real time user traffic;
create a feedback loop associated with:
a first user accessing the content;
a second user accessing a content provider entity, different than the content provider, comprising the content; and
a third user accessing the content provider;
identify a trend from the real time user traffic for the content based upon the rate;
utilize the trend to generate a log, the log comprising:
a type of the trend associated with the content;
a type of the content; and
a duration of the trend;
predict future user traffic to the content based upon the trend; and
responsive to the future user traffic indicating a projected decrease in real time user traffic for the content, allocate content distribution resources from the content to an open stack based upon the projected decrease.

14. The system of claim 13, the content resource allocation component configured to responsive to the future user traffic indicating a projected increase in user traffic for the content, allocate content distribution resources for the content based upon the projected increase.

15. The system of claim 13, the content resource allocation component configured to reallocate content distribution resources to obtain a capacity correlated to the trend, responsive to the future user traffic indicating a projected change in user traffic.

16. The system of claim 13, the predicting future user traffic to the content based upon the trend comprising:
predicting the future user traffic based upon the log.

17. The system of claim 13, the content resource allocation component configured to:
identify an event indicative of a projected change in the trend; and
allocate content distribution resources to content related to the event based upon the projected change.

18. A non-transitory computer readable medium comprising computer executable instructions that when executed by a processor perform a method for content resource allocation, comprising:
receiving a plurality of beacons each comprising information about an interaction of a user with content provided by a content provider;
determining, based upon the plurality of beacons, real time user traffic associated with accessing the content;
determining a rate at which a number of users accessing the content increases from a first timeframe to a second timeframe based upon the real time user traffic;
creating a feedback loop associated with:
a first user accessing the content;
a second user accessing a content provider entity comprising the content; and
a third user accessing the content provider;
identifying a trend from the real time user traffic for the content based upon both the rate and the feedback loop;
utilizing the trend to generate a log, the log comprising:
a type of the trend associated with the content;
a type of the content; and
a duration of the trend;
predicting future user traffic to the content based upon the trend; and
responsive to the future user traffic indicating a projected increase in user traffic for the content, allocating content distribution resources from an open stack to the content based upon the projected increase.

19. The non-transitory computer readable medium of claim 18, the predicting future user traffic to the content based upon the trend comprising:
predicting the future user traffic based upon the log.

* * * * *